United States Patent [19]

Simpson

[11] 3,753,638

[45] Aug. 21, 1973

[54] APPARATUS FOR SHEETING DOUGH

[76] Inventor: Naaman R. Simpson, 5801 S. 28th St., Fort Smith, Ark.

[22] Filed: May 18, 1971

[21] Appl. No.: 144,450

[52] U.S. Cl................. 425/363, 425/193, 425/367, 425/374
[51] Int. Cl............................ A21c 3/02, B29c 3/02
[58] Field of Search...................... 425/87, 193, 194, 425/220, 262, 318, 331, 362, 363, 367, 374; 19/266, 267

[56] References Cited
UNITED STATES PATENTS

| | | | |
|---|---|---|---|
| 432,937 | 7/1890 | Glynn | 425/374 X |
| 2,501,136 | 3/1950 | Miller | 425/363 |
| 533,552 | 2/1895 | Perky | 425/374 |
| 2,863,168 | 12/1958 | Buckly et al. | 425/363 X |

Primary Examiner—Robert L. Spicer, Jr.
Attorney—Beveridge & De Grandi

[57] ABSTRACT

Sheeting dough on a horizontal table by operating a powered roller in horizontal planes back-and-forth over the dough while gradually moving the roller downwardly in horizontal planes towards the table to effectively work and spread the dough into a sheet of desired thickness and consistency. The roller is rotatably mounted through a linkage on a carriage which is reciprocable in tracks extending along opposite sides of the table. The carriage is driven by an endless chain connected through a pulley system to be driven thereby. The linkage which mounts the roller on the carriage is adjustable by a hand lever to change the elevation of the roller relative to the table while the roller is moving over the table in use. In one embodiment, an attachment is provided on the carriage for cutting the dough into pre-determined shapes after it is rolled into the desired thickness.

21 Claims, 9 Drawing Figures

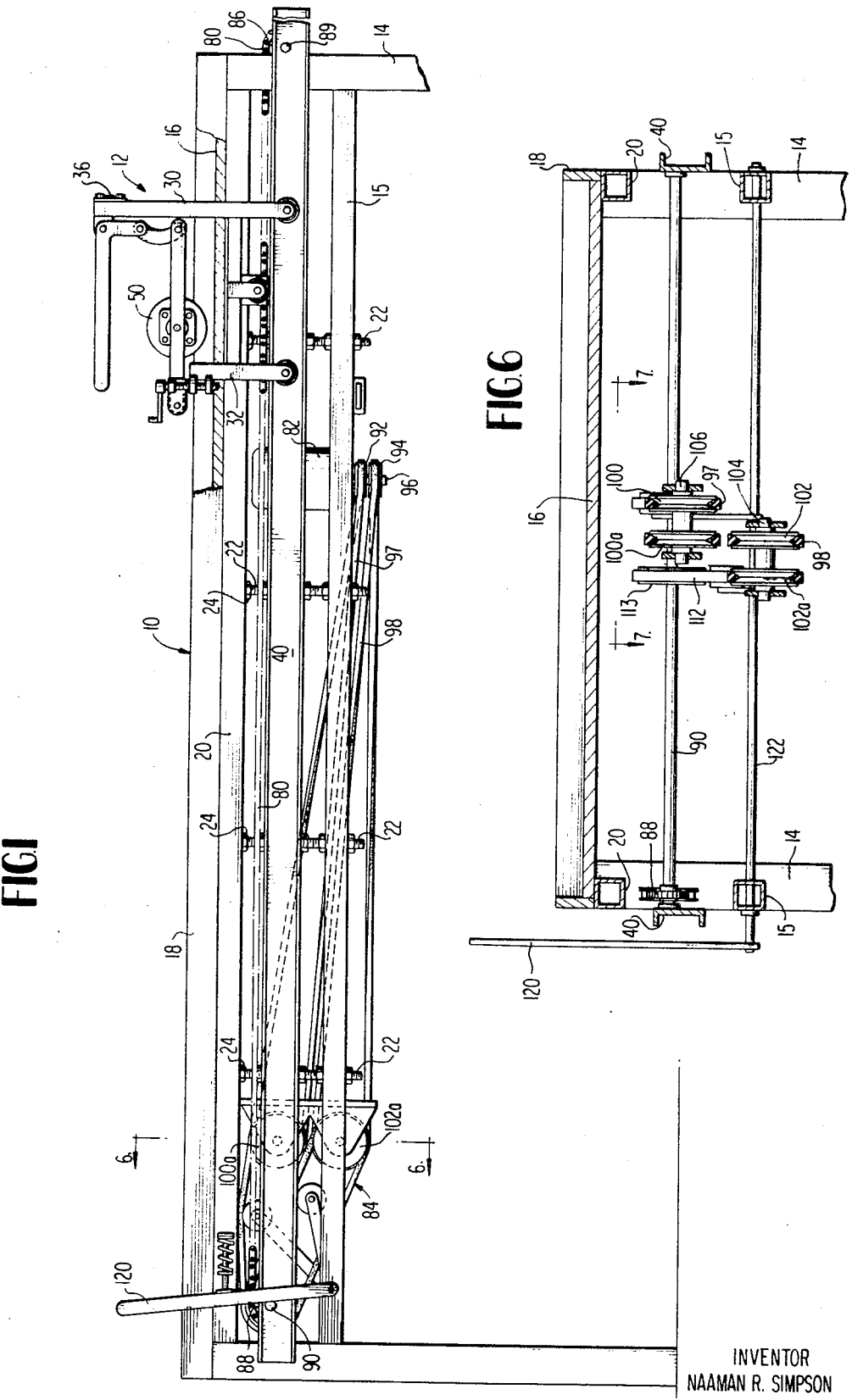

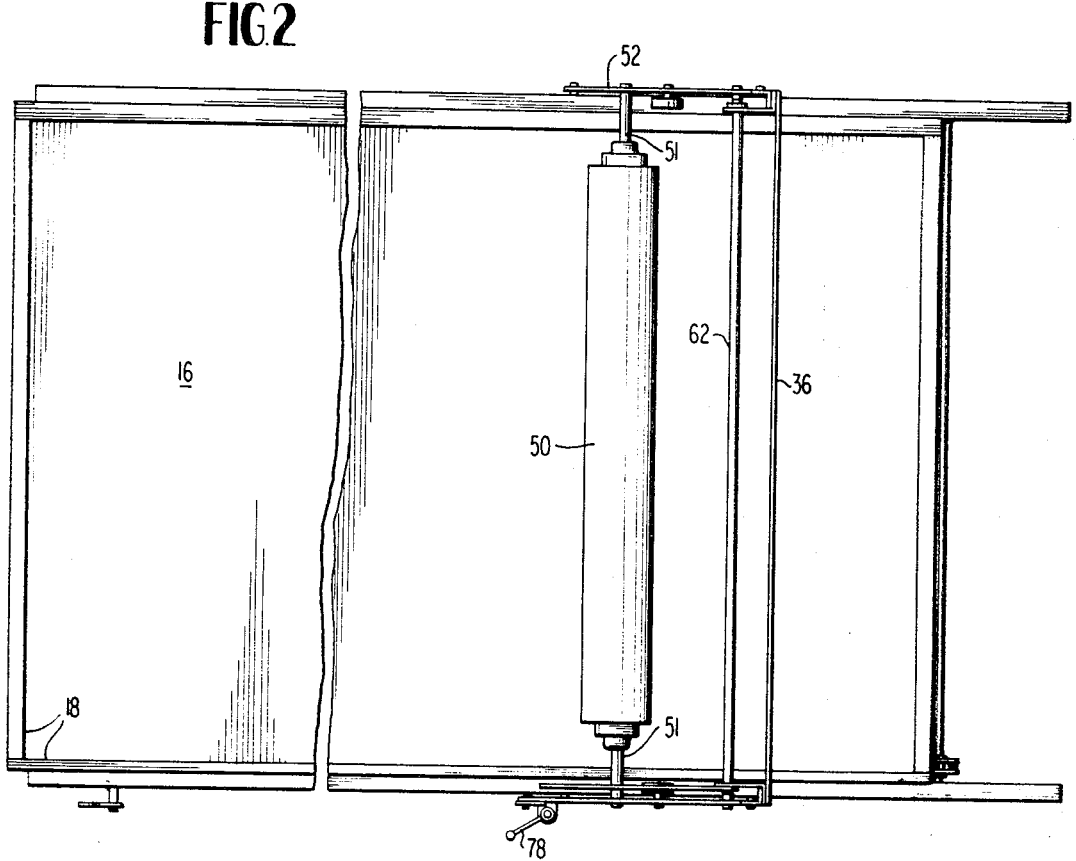
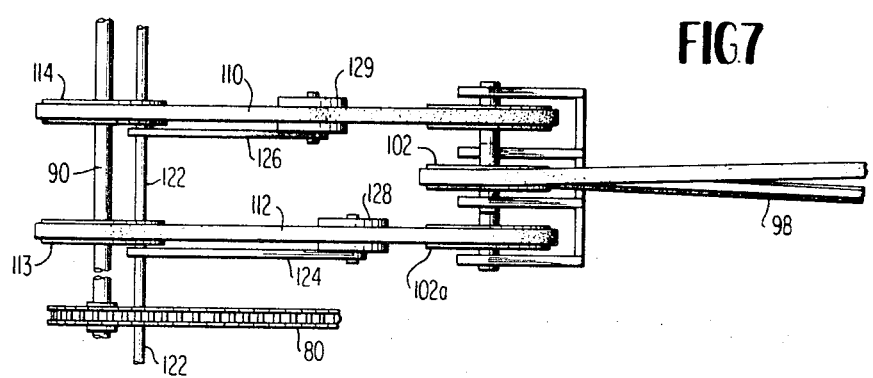

Patented Aug. 21, 1973

APPARATUS FOR SHEETING DOUGH

BACKGROUND OF INVENTION

The present invention generally relates to the art of handling dough, and more particularly to a novel method and apparatus for working dough into a sheet of desired thickness.

It is well recognized that rolling or sheeting dough by hand, is an extremely laborious task particularly when done in commercial mass baking operations. Attempts to mechanize this task have included the use of a roller movable over a dough table by means of a rack and pinion driven either by a hand crank such as shown in United States patent to Winters No. 1,556,887 or by a motor and crank mechanism such as shown in United States patent to Stiles No. 2,735,379. However, both of these patented devices do not provide sufficient control to enable the dough to be worked gradually downwardly from an initial lump condition into a sheet of desired thickness and texture without rupturing the dough. This is because both patented devices do not have provision enabling the operator to raise and lower the roller relative to the dough table surface while the roller is moving horizontally over the surface during the sheeting operation. The clearance between the roller and the dough table in these patented devices remains the same for each dough sheeting operation. The result is that the operator cannot change the pressure applied to the dough as the sheeting operation progresses to provide the necessary control for working the dough into the desired sheeted condition. Furthermore, these prior art devices do not have the versitility to enable different thicknesses of dough sheets to be obtained for various bakery products.

It is further noted that the prior devices shown in U.S. Pat. Nos. 1,556,887 and 2,735,379 both require special structure positioned over the surface of the working table for mounting the roller with the result, that such structure hampers access to the working table to permit manual working of the dough either during an intermediate stage of the sheeting operation or after a sheeting operation when it is desired to use the table for another purpose.

Another attempt to mechanize dough sheeting is disclosed in U.S. Pat. No. 3,329,100 to Seewer. However the Seewer machine is believed to suffer the disadvantage of employing two dough sheeting rollers which, moreover, are not movable over the dough table but instead are situated at the same station between adjacent ends of two conveyer surfaces which carry the dough between the rollers. Furthermore, with Seewer's apparatus, the flour which is used in the dough sheeting operation is constantly moved by the conveyers off the conveyor surfaces which not only makes for a relatively unsanitary operation but further results in flour waste and constant replenishing of flour on the conveyer surfaces. Additionally, the dual roller mechanism in Seewer's device requires specially constructed conveyers and is not adaptable to a conventional dough working table.

U.S. patent to Rich et al. No. 3,191,553 discloses another mechanized dough sheeting mechanism employing a lower horizontal conveyer for conveying dough in one direction and a plurality of dough sheeting rollers movable over the lower conveyer to sheet the dough. Again, this apparatus of the prior art has no provision for working the dough with any degree of control since it does not have any means for adjusting the distance between the rollers and the lower conveyer surface as the sheeting operation proceeds. Furthermore, the Rich et al roller mechanism cannot be applied to a conventional dough table and moreover it entirely covers the dough and the lower conveyer surface preventing any effective access thereto for purposes of working the dough by hand if desired during an intermediate stage of the sheeting operation.

OBJECTS OF THE PRESENT INVENTION

It is therefore an object of the present invention to provide a novel method and mechanized roller apparatus for sheeting dough which overcomes the aforementioned problems to permit the dough to be gradually worked with a great amount of control into a sheet of desired thickness and consistency and without rupturing the dough.

It is a further object of the present invention to provide such a method and apparatus which are highly versatile in that they may be used to produce dough sheets of various thicknesses and consistencies for use in making a variety of bakery products such as for example, doughnuts, maple bars, rolls, twists and fills.

A further object of the present invention is to provide such an apparatus which would be easily controlled by a single operator to produce a high quality dough sheet of deisred thickness and even consistency in a minimum amount of time.

A still further object of the present invention is to provide such an apparatus which may be adapted to a conventional dough table and which when not in use, may be moved to one end of the dough table to clear the same for other operations.

Another object of the present invention is to provide such an apparatus which may be economically constructed and operated and which will give dependable service over long periods of repeated use in commercial baking operations.

SUMMARY OF INVENTION

The above and other objects are achieved in sheeting dough on a horizontal table by operating a motorized roller in horizontal planes back-and-forth over the dough while gradually moving the roller downwardly in horizontal planes towards the table to effectively work and spread the dough into a sheet of desired thickness and consistency. The roller is rotatably mounted through a linkage on a carriage which is reciprocable in tracks extending along opposite sides of the table. The carriage is driven by an endless chain connected through a pulley system to a motor to be driven thereby under the control of the operator. The linkage which mounts the roller on the carriage is adjustable by the operator through a hand lever to change the elevation of the roller relative to the table while the roller is moving horizontally over the table in use. In one embodiment, an attachment is provided on the carriage for cutting the dough into predetermined shapes after it is rolled into the desired thickness.

Other objects and advantages of the present invention will become apparent from the following more detailed description in conjunction with the drawings in which:

FIG. 1 is a side elevational view of apparatus for sheeting dough embodying the present invention;

FIG. 2 is a plan view of the apparatus shown in FIG. 1 with an intermediate portion thereof broken away for clarity;

FIG. 6 is a transverse cross-sectional view taken generally along lines 6—6 of FIG. 1;

FIG. 7 is a fragmental view of a portion of the pulley transmission system as seen along lines 7—7 of FIG. 6;

DETAILED DESCRIPTION

Figure 3:
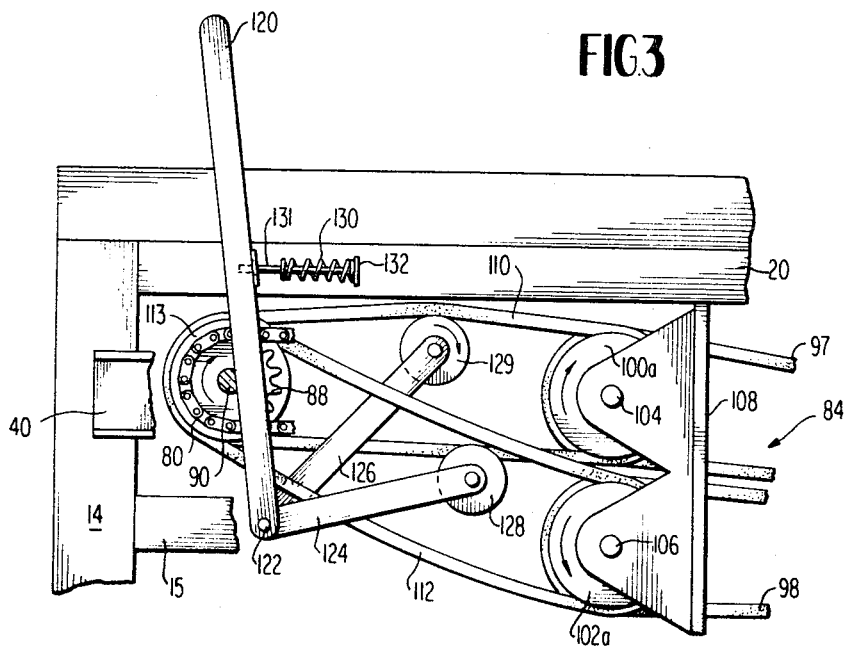
FIG. 3 is a side elevational view of an enlarged portion of the apparatus illustrating a pulley transmission system incorporated therein in one drive position.

Referring now to the drawings in detail, and initially to FIG. 1, there is shown for illustrative purposes only, a dough working table generally designated 10 equipped with apparatus 12 embodying the present invention for sheeting dough on the table. Table 10 may have a conventional basic construction including vertical legs 14 interconnected by elongated horizontal support members 15 which may be made from tubular steel or other suitable rigid material. Supported on legs 14 is a flat rectangular table top 16 extending in a horizontal plane and having an upstanding flange 18 extending around its edges to contain dough thereon in typical fashion. Table top 16 may have any suitable or conventional construction such as plywood covered with a canvas sheet. Below table top 16 on opposite sides thereof are a pair of elongated frame members 20 which may have a constrcution similar to frame members 15; however frame members 20 are movable in a vertical direction for purposes of adjusting the height of table top 16. This adjustment is effected through a plurality of bolts 22 and nuts 24 there being four such assemblies illustrated in FIG. 1 which serve to mount the frame members 20 with respect to lower frame members 15. The elevation of frame members 20 may be adjusted by elevating or lowering nuts 24 on bolts 22.

Figure 8:
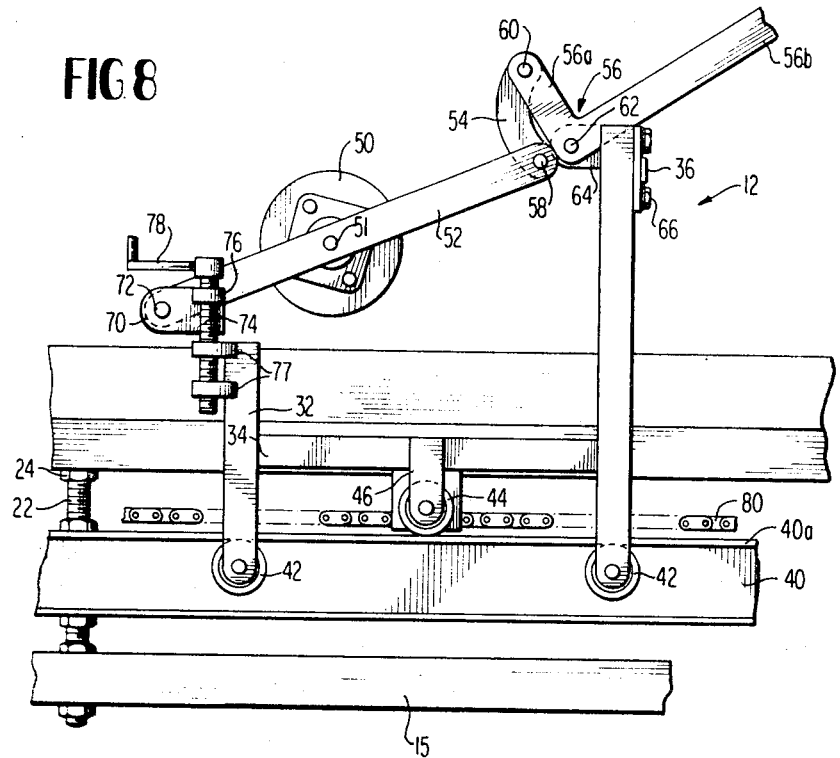
FIG. 8 is an enlarged fragmental side elevational view of a carriage included in the apparatus.

Referring now to FIG. 8 in conjunction with FIG. 1, apparatus 12 for sheeting the dough in accordance with the present invention includes a carriage which in the shown embodiment includes on each side of the table, a pair of vertically extending carriage legs 30 and 32 interconnected by a strut 34 with legs 30 and 32 on opposite sides of the table being interconnected by a cross or mounting member 36. The latter members all are made from suitable material of sufficient strength such as steel bars for example. The carriage is movable along and over the table top in a pair of tracks 40 located on opposite sides of the table where they are fixed in any suitable manner to table legs 14. Tracks 40 are formed from channel steel or aluminum having a generally U-shape with outwardly projecting flanges 40a which receive bearing rollers 42 rotatably mounted to the lower extremities of carriage legs 30, 32 as shown in FIG. 8. Additionally, frame strut 34 interconnecting legs 30 and 32 has depending therefrom a leg 46 with a roller 44 mounted thereon to be engagable on top of flange 40a.

Referring to FIGS. 2 and 8, a dough sheeting roller 50 is mounted on carriage 12 across table top 16 by means of a linkage mechanism which on each side of the carriage includes a main support link 52 in which is suitably journaled a shaft 51 on which roller 50 is rotatably mounted. One end of main link 52 is connected with respect to carriage leg 30 and cross bar or mounting member 36 by means of a first short link 54 and a second link in the form of a crank generally designated 56. One end of short link 54 is connected to main link 52 by means of a pivot 58 while the other end of short link 54 is connected to portion 56a of crank 56 by means of a pivot 60. Crank 56 is pivotally connected with respect to the adjacent leg 30 of the carriage frame by means of a transverse pivot rod 62 received in a right angular bracket 64 which in turn is fixed to carriage leg 30 by means of bolts 66. The position of pivot 62 may be adjusted vertically along carriage leg 30 by loosening bolts 66 and moving the right angle bracket 64 along leg 30 into the desired position and then tightening bolts 66. In this way the range of movement of link 52 and in turn roller 50 may be adjusted.

The opposite end of main link 52 is connected relative to the support leg 32 of carriage 12 by means of a bracket 70 to which the end of link 52 is connected by a pivot 72. Bracket 70 is mounted relative to carriage leg 32 by means of an adjusting bolt 74 received in threads of a flange 76 of bracket 70; the adjusting bolt 74 being rotatably mounted in flanges 77 fixed to carriage leg 32. Rotation of adjusting bolt 74 by a handle 78 will be effective to raise or lower link 52 and in turn roller 50 for a fine adjustment.

In use, the dough sheeting roller 50 is raised from the table top 16 by pivoting crank 56 clockwise (as viewed in FIG. 8) about pivot 62, the latter being achieved by a manual handle formed by elongated arm 56b of crank 56. In order to lower roller 50 towards the table top to bring it into engagement with the dough for sheeting, handle 65b of crank 56 is grasped and crank 56 is pivoted counter-clockwise (as viewed in FIG. 8) about pivot 62 to lower short link 54 and in turn main link 52 and roller 50 into a position such as shown in FIG. 1. Roller 50 is moved over the table top in engagement with the dough to work the same by movement of carriage 12 along the table as will be subsequently described. During working of the dough, the operator repeatedly raises and lowers the roller 50 by manipulating handle 56b of crank 56. In this way, a very sensitive control of the roller is provided which in effect, is the same as one would have with the conventional manual rolling pin. Depending on the product to be ultimately produced from the dough, the range of movement of the roller in the vertical plane as well as the minimum distance between the table top and the circumferential surface of roller 50 may be adjusted through adjusting bolt 74 and also through adjusting the position of pivot 62 as described above. The linkage on the opposite side of the table is the same as that shown in FIG. 8 and the movement from one linkage to the other is achieved through the roller 50 and the transverse pivot rod 62 which interconnects the two linkages.

With reference to FIG. 1, carriage 12 is actuated along the table to move roller 50 over the table top in either direction between the ends of the table by means of an endless drive member shown as a chain 80 powered by a suitable motor generally designated 82 which may be for example, a 1 and ½ horsepower electric motor, and a pulley transmission system generally designated 84.

As shown in FIG. 1, drive chain 80 moves in a vertical plane below table top 16 about end sprockets 86 and 88 mounted on shafts 89 and 90 respectively. Drive chain 80 is suitably fastened to legs 30 and 32 to drive the carriage upon movement of the chain. The drive from motor 82 to drive chain 80 is transmitted in the first instance by pulleys 92 and 94 fixed to output shaft 96 of motor 82 as illustrated in FIG. 1. Pulleys 92 and 94 have trained thereabout pulley belts 97 and 98, the opposite ends of which are trained about pulleys 100 and 102 fixed to shafts 104 and 106 respectively; the latter shafts being suitably mounted in vertical planes one above the other in a bracket 108 fixed to the frame of the table below the table top as shown in FIGS. 1, 3 and 6. Pulleys 100 and 102 thus move in opposite angular directions. Pulley shafts 104 and 106 also have fixed thereto pulleys 100a and 102a connected by pulley belts 110 and 112 to pulleys 113 and 114 both fixed to sprocket shaft 90 (see FIG. 7) to drive the same in either direction depending on which pulley belt 110 or 112 is selected for driving shaft 90.

Figure 4:
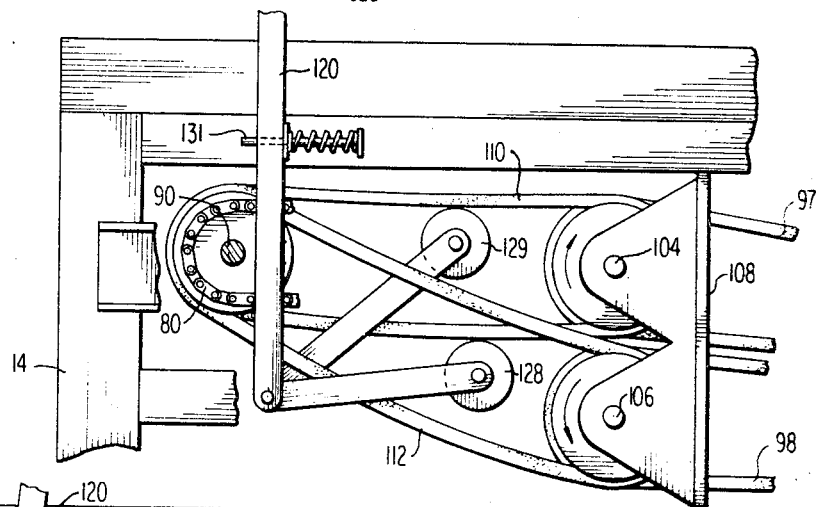
FIG. 4 is a view similar to FIG. 3 however with the transmission system in a neutral position.

As illustrated in FIG. 4, the normal untensioned condition of pulleys 110 and 112 is such that both are slack so that no drive will be transmitted to sprocket shaft 90 for driving the chain. In order to transmit drive to shaft for moving the carriage, a plurality of rollers 128 and 129 are mounted on the ends of associated arms 124 and 126 respectively; both of the latter being fixed to a rod 122 at different angular positions illustrated in FIG. 3 to be actuated by means of a selector lever 120 projecting vertically from rod 122 at one side of the table. Rod 122 is mounted transversely below the table in the frame members 15 on opposite sides thereof.

In the normal or neutral position of selector lever 120, the weight of roller arms 124 and 126 will move them counterclockwise (as viewed in FIGS. 3 and 4) into the position shown in FIG. 4 where the selector lever 120 abuts against a spring mechanism. The latter includes a spring 130 mounted about a rod 131 which in turn is anchored at 132 to any suitable portion of the support frame. In this position of selector lever 120, neither of belts 110 and 112 will be tensioned and no transmission will reach sprocket shaft 90 to drive endless chain 80 and the result will be that the roller carriage will be at rest.

Figure 5:
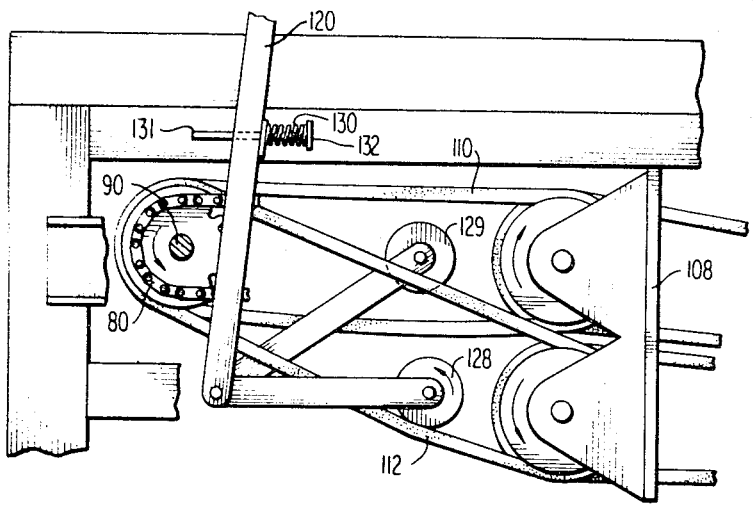
FIG. 5 is a view similar to FIG. 3 but with the transmission system in an opposite drive position.

When it is desired to move the roller carriage along the table in one direction, selector lever 120 is grasped and pivoted about the axis of rod 122 to engage one of rollers 128 and 129 with its respective pulley belt 110 or 112. In FIG. 3, roller 129 is shown in engagement with its associated pulley belt 110 providing tension in the latter enabling drive to be transmitted from pulley 100a to sprocket shaft 90 to drive chain 80 from left to right as viewed in the drawings. In this condition, it will be noted that the other roller 128 is spaced from its associated pulley belt 112. When it is desired to reverse the direction of movement of the carriage, lever 120 is pivoted about rod 122 in a clockwise direction to engage roller 128 with its associated pulley belt 112 while disengaging roller 129 from its associated pulley belt 110 as shown in FIG. 5. This movement of selector lever 120 will also compress spring 130 as shown in FIG. 5 so that should the operator release lever 120, spring 130 will return the selector lever 120 in the neutral position shown in FIG. 4 disengaging the drive.

Although the above drive system has been shown, others may be employed. For example, reversible motors may be employed which would enable push-button control of the roller carriage. In the instant embodiment however, a single operator may still simultaneously manipulate both the selector lever 120 for controlling movement of the carriage and crank handle 56b for controlling the dough roller 50.

It will be seen that because of the movability of dough roller 50 in the vertical direction relative to the table top 16, at the same time the roller is moving horizontally over the table top, a high degree of control is provided in order to enable the dough to be sheeted into the desired thickness and without rupturing or tearing the dough. Additionally, the vertical movement capable of being imparted to the roller 50 as it also moves horizontally over the table allows different degrees of pressure to be exerted on the dough. It will be appreciated that at the start of the dough sheeting operation, the dough will be in a massive lumpy condition so that the operator will start with the roller at a relatively high position spaced from the table top and gradually as the dough is worked into a lesser thickness, the operator will gradually lower the roller 50 by manipulating crank handle 56b. Also it will be appreciated that after each pass over the dough, the operator may raise roller 50 again by appropriately manipulating crank handle 56b and again when another pass is made over the dough the operator will lower the roller into the desired plane to apply suitable pressure on the dough for further manipulating the same. At the conclusion of an operation, the entire carriage 12 may be moved to one end of the table thus clearing the same for other uses.

Figure 9:
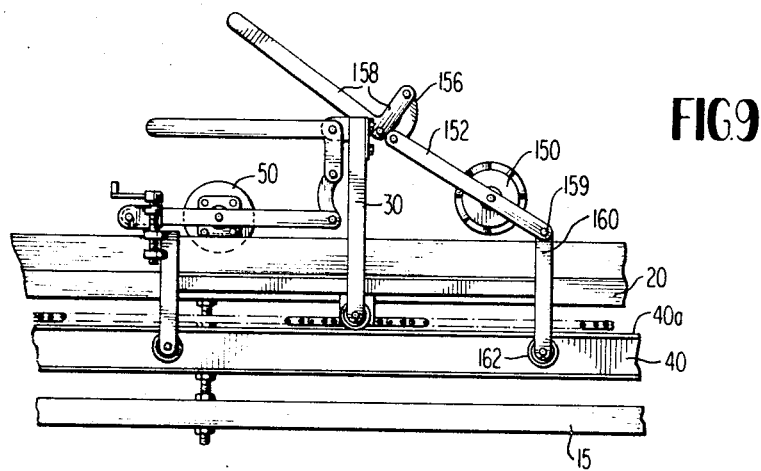
FIG. 9 is a view similar to FIG. 8 but illustrating a modified form of the carriage included in the apparatus.

If desired, the apparatus of the present invention may be employed in conjunction with a cutting mechanism and in this regard reference is made to FIG. 9 which discloses a modified form of the carriage wherein a cutter member 150 is mounted to the carriage opposite roller 50 by means of a linkage similar to that described above. This linkage includes a main link 152 pivotally connected relative to cross piece 36 and carriage leg 30 by means of a short link 156 and a crank 158 employed for raising and lowering main link 152 and consequently cutter 150. The other end of main link 152 is pivoted to carriage leg 160 additionally provided in the present embodiment. Carriage leg 160 is equipped with a roller 162 for engagement under flange of 40a of the track 40. With the presently described modification, after the dough is sheeted into the desired thickness, crank 158 may be pivoted (clockwise as viewed in FIG. 9) to lower cutter 150 into engagement with the sheeted dough to cut the same into the desired size and configuration.

What is claimed is:

1. Apparatus for sheeting dough, comprising in combination, a generally horizontal dough working surface, a dough working roller, first means rotatably mounting the roller for movement in horizontal planes over said surface for engaging and sheeting dough, second means for driving said first means over said surface, and third means included on said first means for adjusting said roller towards or away from said surface as the roller is moving over said surface, said first means being a carriage and wherein said roller is mounted on said carriage by said third means, said third means being movable relative to said carriage for moving said roller to different horizontal planes towards or away from said surface, said third means including a hand operated linkage means.

2. Apparatus defined in claim 1 wherein said carriage includes a cross member extending transversely over said surface, said linkage means being connected to said cross member.

3. Apparatus defined in claim 2 wherein linkage includes a pivot means connecting said linkage means to said cross member, said pivot means being adjustable in the vertical direction to adjust the range of movement of said roller towards or away from said working surface.

4. Apparatus defined in claim 2 further including guide rails mounted on opposite sides of said surface below said track to guide said carriage, said second means including an endless drive member extending under said surface between opposite ends thereof and being operatively connected to said carriage to move the same upon movement of said endless drive member, and a motor for moving said endless drive member.

5. Apparatus defined in claim 4 wherein said second means includes transmission means operatively connecting said motor to said endless drive member for moving said endless drive member in opposite directions selectively for moving said carriage between opposite ends of said surface.

6. Apparatus defined in claim 5 wherein said transmission means includes a hand operated control member for operating said transmission to reverse direction of said roller.

7. Apparatus defined in claim 5 wherein said transmission means includes two pulley belts driven by said motor in opposite directions and adapted to be selectively coupled to said endless drive member to drive the same through said hand operated control member.

8. Apparatus defined in claim 1 further including means associated with said first means for cutting sheeted dough on said surface.

9. Apparatus defined in claim 2 further including cutting means mounted with respect to said cross member for cutting sheeted dough on said surface.

10. Apparatus for working dough into a sheet, the apparatus comprising in combination, a movable carriage, a horizontal dough working surface, a roller mounted on said carrier for working dough on said surface into a sheet, and means including a motor for moving said carriage, said roller movable in a plurality of horizontal planes over said surface, said carriage including control means for moving said roller towards or away from said surface as the roller moves in said horizontal planes over said surface for gradually sheeting dough on said surface, said carriage movable over said surface and including a mounting member overlying said surface, said control means including a linkage interconnected between said mounting member and said roller.

11. Apparatus defined in claim 10 wherein said control means includes a hand operated control lever and wherein there is further included a second control means including a second hand operated control lever for reversing direction of said roller over said dough working surface.

12. Apparatus defined in claim 10 further including cutting means associated and movable with said carriage for cutting sheeted dough on said surface.

13. Apparatus for working dough into a sheet comprising a horizontal dough working surface, means supporting said surface in a horizontal plane, a carraige mounted for movement over said surface between opposite end portions thereof, a roller rotatably mounted in said carriage in a horizontal plane to extend across said surface for engaging and working dough into a sheet, an endless drive member extending longitudinally of said surface and connected to said carriage to drive the same, transmission means selectively engagable with said endless member to drive the same in opposite directions, and a motor connected to said transmission means to drive the same, and wherein said transmission means includes two pulley belts driven in opposite directions by said motor and being selectively operatively connectable to said endless drive member to drive the same in either one of two said opposite directions, said pulley belts and motor being located under said surface.

14. Apparatus defined in claim 13 further including guide rails on opposite sides and below said surface, bearing means depending from said carriage and received in said guide rails, said endless member being located under said surface.

15. Apparatus defined in claim 2 wherein said linkage means includes a main support link having said roller journalled therein for rotation, and at least one link interconnecting said main support link and said cross member.

16. Apparatus defined in claim 15 further including a third link pivotally interconnected to said one link and pivotally interconnected with respect to said cross member.

17. Apparatus defined in claim 16 wherein said third link is a hand lever for operating said linkage means by hand.

18. Apparatus defined in claim 16 wherein there is provided means mounting said main support link at one side of the roller opposite the connection of the main support link to the cross member, for pivotal movement relative to the dough working surface.

19. Apparatus defined in claim 15 including means mounting said main support link on one side of said roller for pivotal movement relative to the dough working surface, and wherein said main support link on the opposite side of said roller is connected to said cross member by means of said one link.

20. Apparatus defined in claim 10 wherein said linkage includes a main support link having said roller journalled thereon for rotation relative thereto, said main support link on one side of said roller being pivotally interconnected with respect to said member, and wherein there is further included means pivotally mounting said main support link on the pposite side of said roller for pivotal movement relative to the dough working surface.

21. Apparatus for working dough into a sheet, the apparatus comprising in combination, a horizontal dough working surface, a roller for working dough on said surface into a sheet, and means including a motor for moving said roller in horizontal planes over said surface and including control means for moving said roller towards or away from said surface as the roller moves in horizontal planes over said surface for gradually sheeting dough on said surface, said control means including a hand actuated control member and wherein there is further included a second control means including a second hand actuated control member for reversing direction of said roller over said dough working surface.

* * * * *